July 6, 1926.  1,591,072
G. ZIEGLER
SPOOL HOLDER FOR ROLL FILM CAMERAS
Filed July 28, 1925
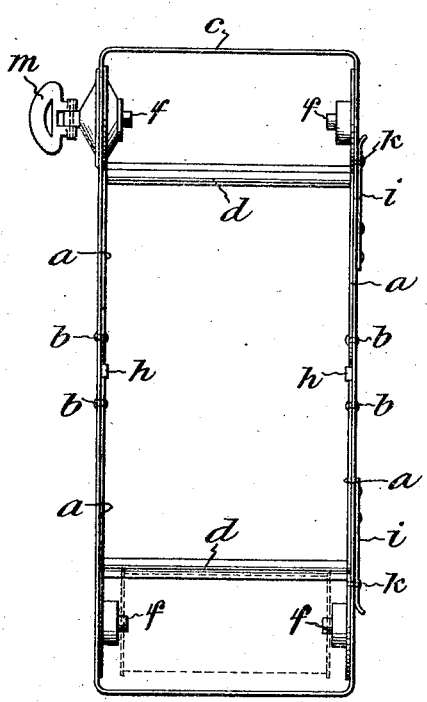
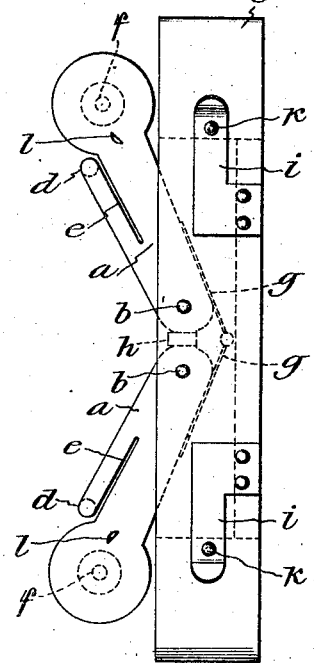
INVENTOR:
Gustav Ziegler,
BY
ATTORNEYS.

Patented July 6, 1926.

UNITED STATES PATENT OFFICE.

GUSTAV ZIEGLER, OF MUNICH, GERMANY, ASSIGNOR TO A. HCH. RIETZSCHEL, G. M. B. H., OF MUNICH, GERMANY.

SPOOL HOLDER FOR ROLL-FILM CAMERAS.

Application filed July 28, 1925, Serial No. 46,628, and in Germany May 9, 1924.

Roll film cameras are known having a spool holder which can be protruded from the camera. In these cameras the spool holder is linked to a part which can be withdrawn from the camera casing in the direction of the optical axis. For inserting or withdrawing the film roll this part must first be pushed fully out of the camera in order to unfold the spool holder and then the roll film can be inserted or withdrawn.

According to the present invention the exchange of the roll film is simplified in that the spool holder is capable of being protruded from the casing by the mere release of a catch or the like. For this purpose the spool holder consists of carrying arms pivoted at one end to the side of the casing and having at the other end a bearing for the spool. These arms may be elastic in lateral direction, so that it is easy to insert the spool. They may be subject to springs pressing them outwardly and may be retained in their inner position by suitable catches.

The accompanying drawings illustrate a suitable construction according to the invention, Fig. 1 being a rear view of a roll film camera having a spool holder in accordance with the invention, and Fig. 2 a side view of the camera when the spool holder has been protruded from it.

The holder consists of two arms $a$ each pivoted at $b$ to the side of the casing $c$. The arms are connected together by a bar $d$ which guides the film; they consist of thin spring brass sheet, or some other spring material, and in order that they may have the necessary spring action they are slotted at $e$. In each spool holder, the guide $d$ and the portions of the arms $a$ between the ends of the guide and the pivots $b$ form a comparatively rigid U-frame, but the free ends of the arms $a$ may be flexed to separate the pins $f$ since the deep slots $e$ provide a relatively great separation of the free and the fixed branches of the slotted arms $a$. When the arms are retracted in normal position, the guides $d$ serve as the transverse supports which position that portion of the film upon which the exposure is to be made. At their free ends they carry pins $f$ to constitute axial bearings for the spools in known manner. Each arm $a$ is subject to a spring $g$ which presses it outwards, the amount of outward movement being limited by a stop $h$. When the arms are within the casing they are held by a spring catch $i$ which by means of a lug $k$ engages in a notch $l$ in the arm.

By lifting the spring $i$ the lug $k$ is disengaged from the notch $l$, so that the arm $a$ is projected from the casing by action of the spring $g$. The roll film can now be removed or inserted by pressing outwards the spring arms and then the arms which automatically grip the spool are pressed back into the casing where they are again engaged by the springs $i$. It will be noted that the arms $a$ lie so close to the respective adjacent sides of the casing $c$, when the arms are within the case, that the case locks the spring arms from against a separation which might result in the inadvertent release of a spool from the pins $f$.

One of the pins $f$ extends through the arm $a$ and the side of the casing $c$ so that it can be turned by the handle $m$, and to allow of the protruding movement of the arm the casing has a suitable slot (not shown) to accommodate the pin. However it is not necessary that both spools should be capable of being protruded, in which case the pins $f$ of the spool which is to be turned by handle $m$ may be carried by the sides of the casing.

The invention makes it possible to insert and withdraw film spools very easily and quickly even in very cold weather.

The arms may be protruded by hand either by pulling or pushing instead of by springs.

What I claim is:—

1. In a camera, a spool support comprising two pairs of arms pivoted at their inner ends to the lateral walls of the camera and carrying at their outer ends bearings for the spools, means tending to force the arms outwardly about their pivots and means for limiting the outward movement thereof.

2. In a camera, a spool support comprising two pairs of arms pivoted at their inner ends to the lateral walls of the camera and carrying at their outer ends bearings for the spools, means releasable from without the camera for holding the arms in normal position and means for limiting the outward movement thereof.

3. In a camera, a spool support comprising two pairs of arms pivoted at their inner ends to the lateral walls of the camera and carrying at their outer ends bearings for the spools, means releasable from without the camera for holding the arms in normal position, means tending to force them outwardly about their pivots and means for limiting the outward movement thereof.

4. In a camera, a spool support comprising a pair of arms pivoted at their inner ends to the lateral walls of the camera, means tending to project the outer ends of said arms from the camera, and means cooperating with the inner ends of said arms to limit the outward pivotal movement of the said arms.

5. Apparatus according to claim 4, including releasable means for retaining the said arms in normal retracted position within the camera.

6. In a camera, a spool support including a pair of arms having spool supporting means at their outer ends and being pivoted at their inner ends to the camera in close proximity to the longitudinal center thereof, and means cooperating with the inner ends of said arms to limit pivotal movement of the outer ends in outward direction.

7. In a camera, a spool support including a pair of arms of sheet material, spool receiving bearings at the outer ends of said arms, means pivotally supporting the inner ends of said arms, and a transverse film supporting member extending between respective intermediate points of the said arms and cooperating with the respective inner portions thereof to form a relatively rigid U-frame.

8. Apparatus according to claim 7, in which each of the said arms is slotted from a point intermediate the length thereof towards the inner end thereof, and the said member extends between free ends of the shorter branches formed by said slot.

9. In a camera, a spool support including two pairs of arms of sheet material, pivoted at their inner ends to the lateral walls of the camera and carrying at their outer ends bearings for the spools, and means intermediate the inner and outer ends of each pair of arms for spacing the same and defining a transverse film support.

10. In a camera, a spool support including two pairs of arms of sheet material pivoted at their inner ends in proximity to each other to the lateral walls of the camera and carrying at their outer ends bearings for the spools, each arm being slitted for a part of its length to define two resilient portions of unequal length, and means interconnecting the free ends of the shorter resilient portions to define film guides.

In testimony whereof I affix my signature.

GUSTAV ZIEGLER.